Jan. 2, 1962 W. D. KELLY 3,015,710
THERMOSTATIC CONTROL UNIT
Filed Sept. 17, 1959 2 Sheets-Sheet 1

Inventor
William D. Kelly
By Hofgren, Brady, Wegner, Allen & Steelman
Attorneys

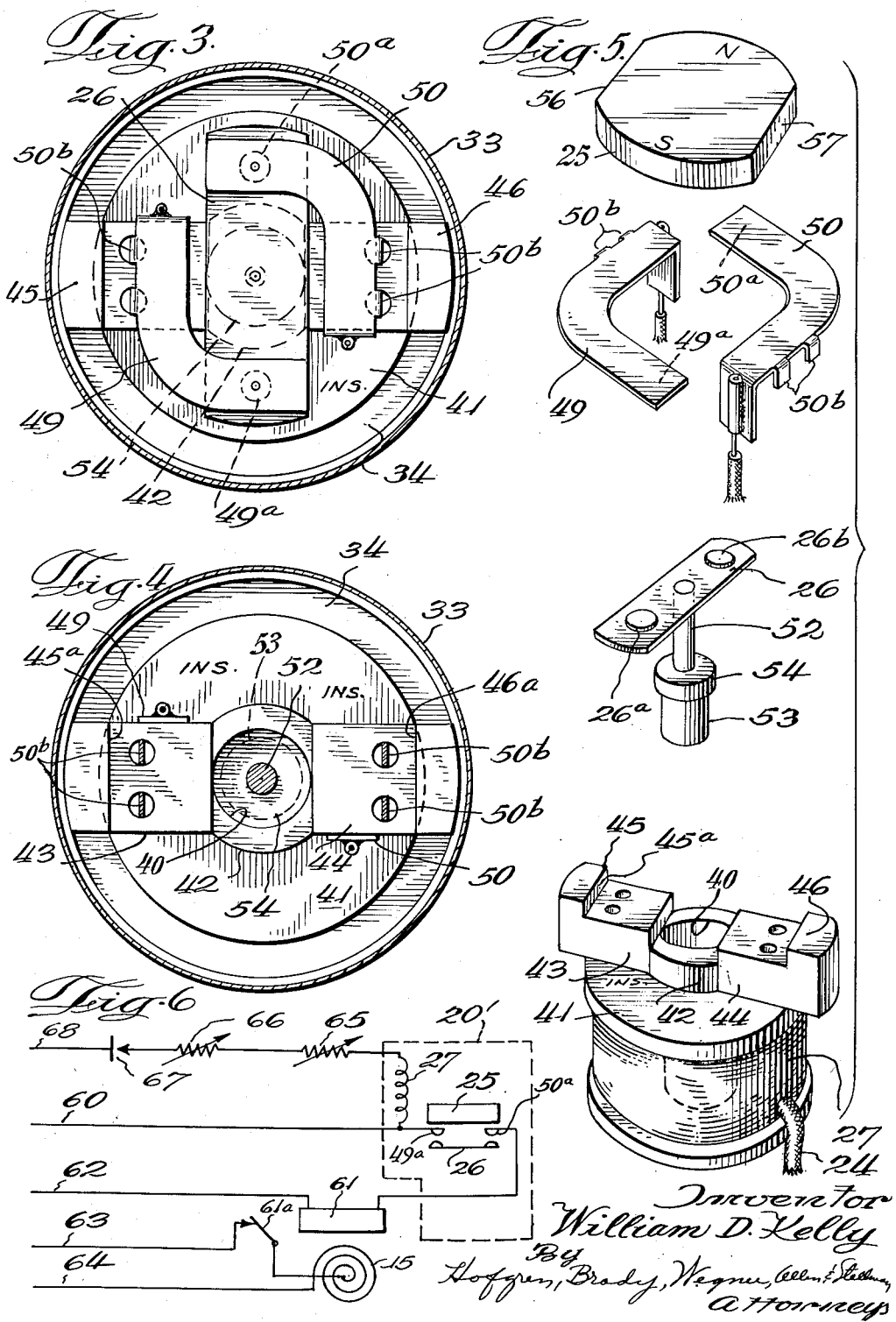

United States Patent Office 3,015,710
Patented Jan. 2, 1962

3,015,710
THERMOSTATIC CONTROL UNIT
William D. Kelly, Western Springs, Ill., assignor to Ferro Corporation, a corporation of Ohio
Filed Sept. 17, 1959, Ser. No. 840,652
5 Claims. (Cl. 219—20)

This invention is concerned with a thermostatic control unit for a range element.

A range element, as in a stove is sometimes provided with a thermostatic control unit which senses the temperature of the element, or more specifically the temperature of the pan being heated, and controls the operation of the element to maintain a desired temperature. The control unit is preferably adjustable so that the temperature may be preset at the proper level for the type of cooking which is being undertaken. The presently known thermostatic control units utilize a bimetallic switch or the like for sensing the temperature of the pan. With this type of control unit it is difficult to establish initial calibration and to maintain it over a period of time and to vary the operating point over a sufficient range to provide an adequate cooking control.

This invention is concerned with a new and improved thermostatic control unit which obviates these objections, providing accurate, easily calibrated control in a rugged, inexpensive unit.

One feature of the invention is the provision of a control unit including a circuit affecting the operation of the range element, a switch in the circuit having contact means movable from a first to a second position and magnet means urging the contact means toward the second position, the magnet means being in heat transfer relation with the element and having a marked magnetic field strength with temperature. As a result of the variation in field strength, the contact means moves between the first and second positions at a predetermined temperature, controlling the operation of the range element. Another feature is the provision of further means, as an electromagnet, urging the contact means away from the heat sensitive magnet. Variation of the current through the electromagnet provides control of the temperature maintained by the unit.

A further feature is that the unit includes a coil bobbin which carries fixed contact means in the range element circuit, and has a coil wound on the bobbin with a core movable therein. A movable contact is carried by the core for movement into and out of engagement with the fixed contact means and the heat sensitive magnet urges the movable contact into engagement with the contact means while the current passing through the coil urges the movable contact away from engagement with the contact means. At low temperatures, the magnet keeps the contacts closed while at an elevated temperature the force applied on the contact through the electromagnet overcomes the force of the magnet, opening the contacts and interrupting the circuit for the range element.

Still another feature is that the contact means and electromagnet coil have a common terminal and are connected with the remainder of the system through a three conductor cable leading to the unit.

Further features and advantages of the invention will readily be apparent from the following specification and from the drawings, in which:

FIGURE 3 is a section taken generally along line 3—3 of FIGURE 2;

FIGURE 4 is a section taken generally along line 4—4 of FIGURE 2;

FIGURE 5 is an exploded perspective view of the elements of the thermostatic control unit; and FIGURE 6 is a schematic diagram of the circuit of the control unit and the range element.

Electrically energized range elements are particularly adapted for use with thermosatic control units of the type disclosed herein, and the specific embodiment of the control unit will be described in connection with such a range element. It will be understood, however, that the unit may be utilized with other types of range elements, as those which burn gas or the like. The control unit for a range element is preferably located in the center of the range element so that it responds accurately to the temperature of the utensil being heated. As a result, the unit is necessarily small in size and is subjected to rather high temperatures. As pointed out above, it must be capable of accurate calibration and must retain calibration in use over extended periods of time. Furthermore, it is desirable that it be capable of controlling the temperature of the element or the pan being heated at differing levels so that different types of cooking may be done. These requirements are satisfied in the control unit disclosed herein which is simple in construction and easy to adjust.

Figure 1:
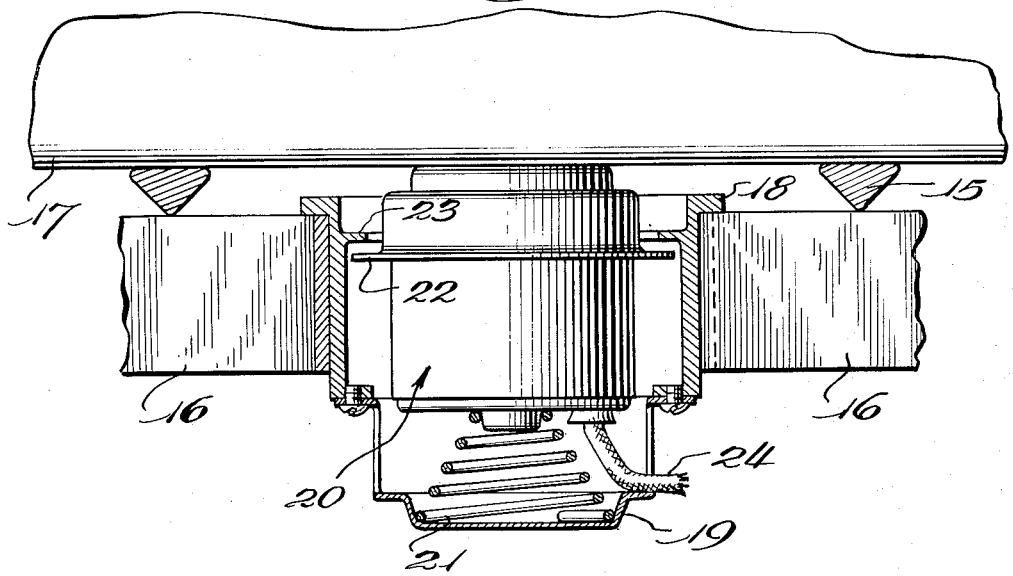
FIGURE 1 illustrates a portion of a heating element and its mounting with the thermostatic control unit in elevation.
Figure 2:
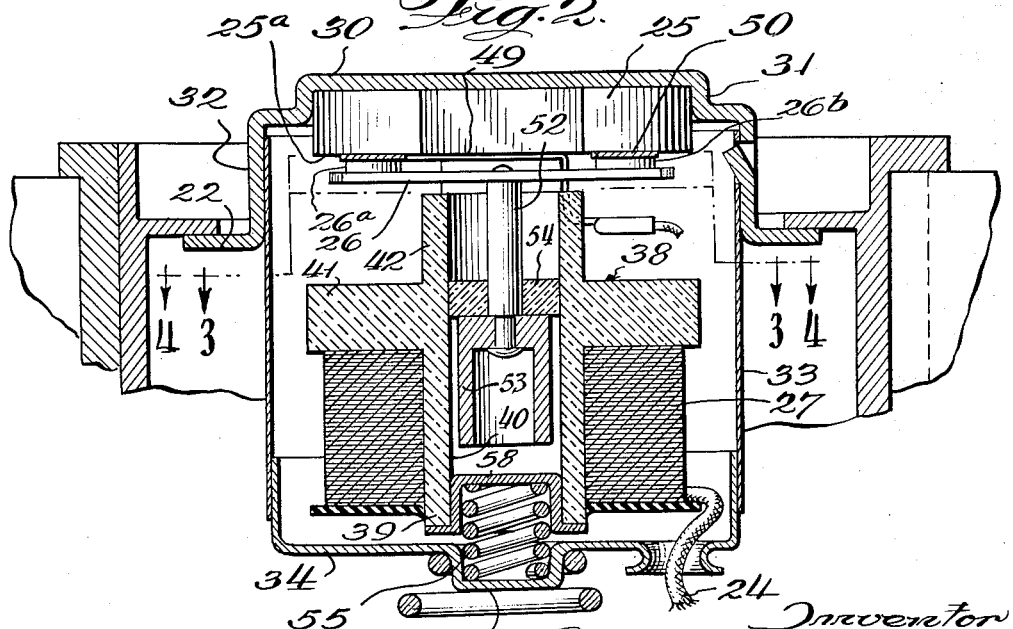
FIGURE 2 is an enlarged vertical section taken through a thermostatic control unit embodying the invention.

Turning now more particularly to the drawings, in FIGURE 1 an electric heating element 15 is carried on the arms of a support or spider 16 which may be received in an opening in the cooking surface of a range, not shown. The lower portion of a pan 17 is shown supported on the heating element 15. A control unit supporting ring 18 is carried by the arms 16 of the spider and has a bracket 19 depending therefrom. The sensing portions of the thermostatic control unit are contained within a housing 20 which is urged upwardly into contact with the lower surface of pan 17 by a spring 21 supported on bracket 19. An outwardly extending flange 22 on the housing engages an inwardly extending flange 23 on ring 18, limiting the upward movement of the housing. Electrical connections to elements within housing 20 are made through a cable 24. As will appear in more detail below, elements within housing 20 sense the temperature of the pan 17 and control the application of energy to electrical heating element 15 to maintain a desired pan temperature.

Briefly, the sensing unit incorporates a magnet 25 the field strength of which varies inversely with the temperature and which urges a switch member 26 toward closed circuit condition, against the electromagnetic force applied to the switch member 26 by current flowing through a coil 27. As the temperature of pan 17 increases the force applied to switch member 26 by magnet 25 decreases until the switch opens the control circuit reducing or cutting off the power to the element 15. As the temperature of the pan falls, the field strength of magnet 25 increases closing switch 26 and reenergizing the heating element. A current flowing in coil 27 may be varied to adjust the operating point or range of the unit.

The illustrated embodiment of the invention will now be described in detail. Housing 20 includes a top element 30 having a cup-shaped configuration with a wall portion 31 within which magnet 25 is received and frictionally held. Top 30 is preferably made of aluminum and both surfaces are black anodized to facilitate transfer of heat between pan 17 and permanent magnet 25. A skirt portion 32, which has an outwardly extending flange 22 formed integrally therewith, receives a cylindrical housing body portion 33, the lower end of which is closed by end member 34. A cup-shaped recess 35 is centrally located in end member 34 and centers spring 21.

A ceramic coil form 38 has a cylindrical bobbin portion 39 with a bore 40 therethrough. A coil 27 is wound on bobbin portion 39 below a transverse flange 41. Above the flange is a cylindrical portion 42 which is an extension of the bobbin portion 39 and through which a bore 40 extends. Cylindrical body portion 42 is flanked by a pair of upstanding shoulders 43 and 44, surmounted by extensions 45 and 46 which have planar inner surfaces 45a and 46a.

The electrical control circuit includes a pair of fixed contact members 49 and 50 having contact portions 49a and 50a, respectively. Switch member 26, which bridges between contacts 49 and 50, is of soft iron to respond to the field of magnet 25, and is provided with suitable alloy contacts 26a and 26b at either end thereof. Bridging contact member 26 is mounted on a pin 52 which has a soft iron core 53 secured at the other end and movable within bore 40. A washer 54, which may be of graphite, is mounted on pin 52 and guides the movement of core 53 in the bore.

Fixed contacts 49 and 50 are supported on the shoulders 43 and 44 of core 38 and are provided with tabs 49b and 50b, respectively, which extend into mating recesses 43a and 44a of the shoulders. The core 38 is urged upwardly in housing 20 by a spring 55 holding the fixed contacts against the undersurface of magnet 25. The surfaces 45a and 46a on the core extensions 45 and 46 engage flats 56 and 57 on magnet 25 to align the various elements of the assembly. Spring 55 is seated in recess 35 of lower housing member 34 and bears against an inverted cup 58 received in the lower end of bore 40.

A preferred circuit for the control unit is illustrated in FIGURE 6, the elements within housing 20 being enclosed within broken line 20'. The current drawn by heating element 15 may be several amperes, much too great to be controlled through the contacts of a small switch such as that mounted within the control unit itself. Accordingly, the control unit switch actuates a relay which in turn controls the application of power to the heating element 15. The temperature controlled circuit includes a lead 60, fixed contacts 49a and 50a and movable switch contact 26, connected in series with a relay 61 and conductor 62 across a suitable source of potential as 110 volts A.C. A contact 61a associated with relay 61 is connected in series with heating element 15, the heating element circuit being connected through conductors 63 and 64 with a suitable energizing source, which may be 110 or 220 volts A.C. The control circuit for calibrating and adjusting the operation of a control unit includes electromagnet coil 27 connected in series with adjustable resistors 65 and 66 and a diode or rectifier 67, through conductors 60 and 68 to a source of 110 volt A.C. potential. Adjustable resistor 65 provides for calibration of the control unit and may be located within the range itself. Adjustable resistor 66 may be associated with a manual or front panel control which enables the user to establish the operating point of the control unit by varying the current through coil 27. Diode 67 converts the alternating current to pulsating direct current in coil 27 simplifying the design of the coil and core 53. With the circuit shown, in which conductor 60 is connected in the circuit of both coil 27 and the switch, only three conductors need be provided in cable 24 connected between the elements in housing 20 and other portions of the circuit. This simplifies the wiring and reduces the cost of the unit.

An example of a magnet which has the requisite temperature-field strength characteristics for this sensing unit is a ceramic element sold under the trademark "Ceramagnet" sold by Stackpole Carbon Co., of Pennsylvania. The magnet is preferably designed with the north and south poles at either end, as illustrated in FIGURE 5, and the field through the magnet parallel to flat edge surfaces 56 and 57. Preferably the magnetic effect of the magnet is concentrated on the lower surface 25a to have maximum effect on movable switch member 26.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A thermostatic control unit for a range element, comprising: a circuit affecting the operation of said range element; a switch in said circuit having contact means movable from a first to a second position; magnet means urging said contact means toward said second position, said magnet means being in heat transfer relation with said element and having a marked and linear magnetic field strength variation with temperature over a substantial temperature range, the position of said contact means being dependent upon the temperature of said magnet means; switch bias means urging said contact means toward said first position, in opposition to the effect of said magnet means; and means for varying the effect of said switch bias means.

2. A thermostatic control unit for a range element, comprising: a circuit affecting the operation of said range element; a coil bobbin; contact means carried by said bobbin and connected in said circuit; a coil on said bobbin; a core movable in said coil; a movable contact carried by said core and movable into and out of engagement with said contact means; a magnet urging said movable contact into engagement with said contact means, said magnet being in heat transfer relation with said element and having a marked magnetic field strength variation with temperature; resilient means urging said bobbin and contact means into engagement with said magnet; and circuit means including an adjustable element for passing a controlled current through said coil urging said core and movable contact away from engagement with said contact means.

3. A thermostatic control unit for a range element comprising: a circuit affecting the operation of said range element; a coil bobbin with locating holes in the end thereof; a pair of fixed contacts carried by said bobbin and connected in said circuit, said fixed contacts having tab portions extending into said holes; a coil on said bobbin; a core movable in said coil; a movable contact bridging said fixed contacts and carried by said core; a magnet urging said movable contact into engagement with said contact means, said magnet being in heat transfer relation with said element and having a marked magnetic field strength variation with temperature; and means for passing current through said coil urging said core and movable contact away from engagement with said contact means.

4. In a thermostatic control unit for a range element having a control circuit: a housing in heat transfer relation with said element; a switch in said housing and connected in the control circuit of said range element, said switch being responsive to the temperature of said element and having only a pair of terminals; a control coil in said housing and in operative relation with said switch, to affect operation thereof and having only a pair of terminals, one of the switch terminals being common with one of the coil terminals; and three conductor circuit means connected with the terminals of the switch and control element and extending from said housing.

5. A thermostatic control unit for a range element, comprising: a circuit affecting the operation of said range element; a switch in said circuit having contact means movable from a first to a second position; electromagnetic means urging said contact means toward said first position and connected in a circuit with a variable element controlling the current flowing therethrough; magnet means urging said contact means toward said second position, said magnet means being in heat transfer relation with said element and having a marked, linear magnetic field strength variation with temperature over a substantial temperature range, the position of said contact means being dependent upon the relation between the temperature of the magnet means and the current through said electromagnet, variation of the current providing a control over the temperature maintained by said element.

References Cited in the file of this patent

UNITED STATES PATENTS

| | | |
|---|---|---|
| 2,207,871 | Myers | July 16, 1940 |
| 2,390,985 | Boyer | Dec. 18, 1945 |
| 2,606,990 | Akeley | Aug. 12, 1952 |
| 2,610,271 | Russell | Sept. 9, 1952 |
| 2,611,069 | Frazier | Sept. 16, 1952 |
| 2,638,496 | Church | May 12, 1953 |
| 2,657,299 | McNairy | Oct. 27, 1953 |
| 2,943,176 | Holtkamp | June 28, 1960 |
| 2,944,135 | Holtkamp | July 5, 1960 |
| 2,953,723 | Flannagan | Sept. 20, 1960 |